(12) United States Patent
Benson

(10) Patent No.: US 8,701,732 B2
(45) Date of Patent: Apr. 22, 2014

(54) APPARATUS AND METHOD FOR FORMING A HOLLOW COMPONENT

(71) Applicant: Rolls-Royce PLC, London (GB)

(72) Inventor: Christopher James Benson, Derby (GB)

(73) Assignee: Rolls-Royce PLC, London (GB)

(*) Notice: Subject to any disclaimer, the term of this patent is extended or adjusted under 35 U.S.C. 154(b) by 0 days.

(21) Appl. No.: 13/663,922

(22) Filed: Oct. 30, 2012

(65) Prior Publication Data

US 2013/0146210 A1    Jun. 13, 2013

(30) Foreign Application Priority Data

Dec. 8, 2011 (GB) .................................. 1121061.4

(51) Int. Cl.
  *B29C 53/82* (2006.01)

(52) U.S. Cl.
  USPC ............ 156/443; 156/173; 156/175; 156/189

(58) Field of Classification Search
  CPC .... B29C 33/485; B29C 53/822; B29C 53/824
  USPC .................... 156/169–175, 189, 446
  See application file for complete search history.

(56) References Cited

U.S. PATENT DOCUMENTS

| | | | |
|---|---|---|---|
| 3,975,816 A | 8/1976 | Carter | |
| 4,350,549 A * | 9/1982 | Frehner | 156/161 |
| 4,983,240 A | 1/1991 | Orkin et al. | |
| 2008/0087371 A1 * | 4/2008 | Friedrich et al. | 156/166 |

FOREIGN PATENT DOCUMENTS

| | | |
|---|---|---|
| GB | 930 156 | 7/1963 |
| GB | 1 150 115 | 4/1969 |
| GB | 1 537 559 | 12/1978 |

OTHER PUBLICATIONS

Feb. 18, 2012 British Search Report issued in Application No. 1121061.4.

* cited by examiner

*Primary Examiner* — Katarzyna Wyrozebski Lee
*Assistant Examiner* — Carson Gross
(74) *Attorney, Agent, or Firm* — Oliff PLC

(57) ABSTRACT

A flexible mandrel 100 has a plurality of flexible elements 130 extending between two spaced flanges 110, 120. A means for adjusting the radial position of each of the flexible elements 130 along the length of the mandrel 100 between the flanges 130 enables the plurality of flexible elements 130 to be configured in a variety of symmetrical and asymmetrical forms. Conventional composite fiber or tape laying techniques may then be used to form one-piece, revolute, composite components. The flexible mandrel 100 can then be collapsed and withdrawn from the interior volume 202 of the formed component.

13 Claims, 4 Drawing Sheets

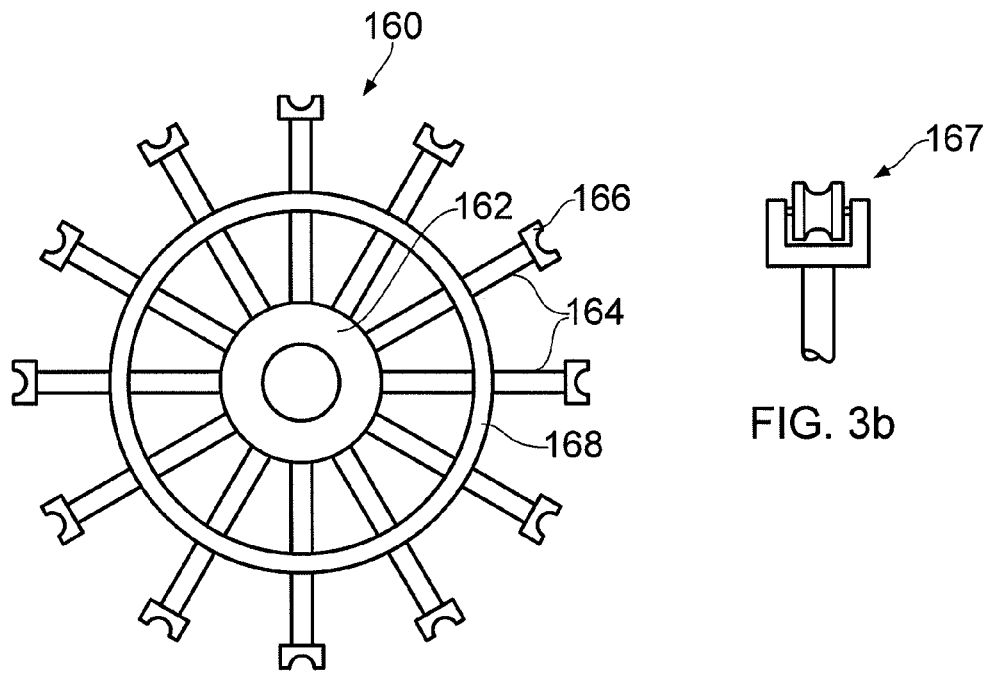
FIG. 3a
FIG. 3b
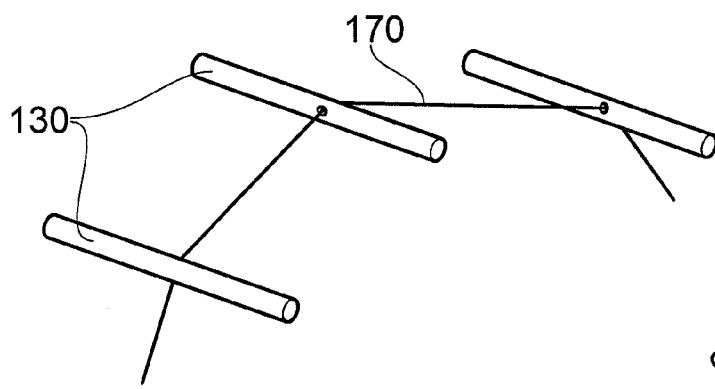
FIG. 4
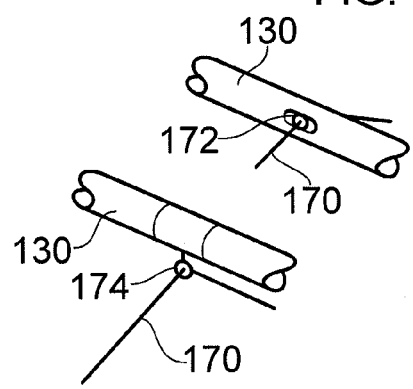
FIG. 5a
FIG. 5b

APPARATUS AND METHOD FOR FORMING A HOLLOW COMPONENT

This invention claims the benefit of UK Patent Application No. 1121061.4, filed on 8 Dec. 2011, which is hereby incorporated herein in its entirety.

FIELD OF THE INVENTION

This invention relates to a method and apparatus for forming a hollow component and particularly, but not exclusively, to the forming of hollow, revolute components.

BACKGROUND

Conventional methods for manufacturing hollow, revolute components from composite materials typically require extensive tooling fixtures and labour-intensive assembly procedures. One such method involves wrapping carbon fibres around a rotating mandrel which provides the basic shape of the component. The carbon fibres are pre-impregnated with a thermoset epoxy resin, and are applied over the rotating mandrel in multiple plies to form the hollow component.

Filament winding, fibre placement, and tape laying are three known methods for applying composite fibres to a rotating mandrel to form a hollow component. In a filament winding process, the mandrel is typically suspended horizontally between end supports. The mandrel rotates about the horizontal axis as a fibre application instrument moves back and forth along the length of the mandrel, placing fibres onto the mandrel in a pre-determined configuration. In most applications, the filament winding apparatus passes the fibre material through a resin bath just before the material touches the mandrel. This is called wet winding. In other applications, often termed dry winding, the fibre has been pre-impregnated with resin, eliminating the need for the resin bath. Following oven or autoclave curing of the resin, the mandrel can remain in place and become part of the wound component, or it can be removed.

Tape laying is similar to the fibre placement process described above except that fibre tape, rather than individual fibre tows, is laid down on the rotating mandrel to form the hollow component. Narrower tape widths provide enhanced steerability and control during application and are often used for the production of hollow components having a non-cylindrical shape.

A problem with this type of component forming is that the geometry of the component is limited by the need to be able to remove the mandrel from the finished cured component. Thus, for example, components having a double curved form, such as a convergent-divergent nozzle cannot be formed without the use of multi-piece mandrels. This can cause joint discontinuities which in turn can be difficult and costly to rectify.

A further problem with conventional tooling is that a separate mandrel must be manufactured for each component form and size. Conventional mandrels are generally formed as ring roll forged metal components which make their production costly and time-consuming. In addition, the need for separate mandrels for each component form and size, results in the need to store large quantities of mandrels which is inconvenient.

Furthermore, the expansion and contraction of the mandrels during the heating cycle portion of the curing process (involving temperatures of ≈135° C.) results in conventional mandrels having a finite useful working life. This may be as little as 100 cycles, before replacement of the mandrel is required.

STATEMENTS OF INVENTIONS

According to a first aspect of the present invention there is provided a mandrel for forming a hollow component from a laminated material comprising first and second flanges spaced apart from one another along an axis of the mandrel, a plurality of flexible elements extending between the first and second flanges and a means for adjusting the position of each of the flexible elements along the length of the axis of the mandrel, such that the plurality of flexible elements define a three-dimensional revolute form.

The use of a mandrel having two flanges with a plurality of flexible elements extending therebetween and a means of adjusting the position of each of the flexible elements allows a single mandrel to be configured to take up a wide range of geometrical forms and sizes. This makes the mandrel of the invention flexible and cost effective.

Furthermore, the adjusting means allows changes and adjustments to be made to the form of the mandrel during production, for example to cater for changing requirements or to correct errors.

The use of flexible elements to produce the exterior surface form of the mandrel allows the elements to be collapsed and withdrawn from the hollow component irrespective of the complexity of the component's external geometric form.

By employing flexible elements to produce the form of the mandrel, the present invention enables a wide variety of mandrel forms, i.e. variation in shapes and sizes, to be created using a single tooling set. This greatly reduces the quantity of separate mandrels required to produce a variety of different hollow components and greatly reduces tooling and manufacturing costs, particularly for prototype production.

In one embodiment of the invention, the two flanges are circular with the flexible elements being regularly spaced around the respective peripheries of the flanges. The flexible elements extend between the flanges and are each aligned parallel with the axis of rotation. In this arrangement, symmetrically reducing or increasing the radius of the flexible elements can produce a rotationally symmetrical hollow component.

In other embodiments, the flanges may be non-circular and/or the flexible elements may be unevenly spaced around the peripheries of the flanges. In this way, rotationally asymmetrical forms can be produced.

In one embodiment of the invention, the two flanges are parallel to one another and each flange is oriented normally to the axis of rotation of the mandrel. In alternative arrangements, one or both of the flanges may be oriented at different angles to the axis of rotation.

In one arrangement, the flexible elements may be formed as metal braided cords or wires. Each of the cords or wires passes through respective holes in each of the two flanges. In an alternative arrangement, the holes in the flanges may be provided with guide rollers to reduce frictional forces between the cords or wires and the flanges. Reducing the frictional forces between the cords or wires and the flanges may reduce any variation in tensional loads between the cords or wires.

Optionally, the first and second flanges are separated from one another by a central post aligned with the axis of the mandrel.

In one embodiment of the invention, the two flanges are connected together and separated from one another by a central post, to form a spool. The central post is aligned with the axis of rotation of the mandrel.

Optionally, the means for adjusting the position of each of the flexible elements comprises at least one flexible element support frame, positionable axially along the axis of the mandrel and having a plurality of locating portions, each of the plurality of locating portions being connected to a respective one of the plurality of flexible elements.

In one embodiment of the invention, the support frame comprises a plurality of spokes, with each of the spokes being provided, at its radially outermost end, with a locating portion in the form of an end block which is secured to the flexible element. The axial position of the support frame along the axis of the mandrel and the radial position of the locating portions are adjustable. This arrangement enables the position of the flexible elements, both radially and circumferentially, to be varied along the axis of the mandrel.

By being secured to the respective flexible element, the end block can both push radially outward and pull radially inward on the respective flexible element. In this way, a variety of geometrical forms such as, for example, convergent-divergent, straight-divergent and straight-convergent profiles, can be provided on the surface of the mandrel by the use of several support frames.

In an alternative embodiment, each of the spokes is provided, at its radially outermost end, with a turning block which supports, i.e. pushes radially outward against, the flexible element. The turning block may comprise a notched cylinder or a profiled roller, which accommodates the respective flexible element.

In a further alternative arrangement the support frame comprises a plate or ring having a plurality of locating portions disposed around its periphery. Each of the locating portions is formed as a groove or notch, sized to accommodate a respective one of the flexible elements. This arrangement is simpler and more cost effective than the above-mentioned 'spoked' arrangement but is less flexible due to the lack of radial adjustment.

Optionally, the means for adjusting the position of each of the flexible elements further comprises at least one contractible hoop element, positionable axially along the axis of the mandrel and connected to each of the plurality of flexible elements in a plane normal to the axis of the mandrel, whereby contraction of the or each hoop element causes each of the plurality of flexible elements to move closer to the axis of the mandrel.

In one embodiment of the invention the hoop element takes the form of a cord, or cable, which is connected circumferentially to each of the flexible elements. By contracting the hoop element, the corresponding circumference defined by the flexible elements can be reduced.

Any suitable securing technique may be used to locate the hoop element on each of the respective flexible elements. The hoop element may pass through each of the flexible elements, for example via a stiffening eyelet. Alternatively, the hoop element may pass through a separate hook or loop which is itself attached to a radially innermost side of each flexible element.

Optionally, the means for adjusting the position of each of the flexible elements further comprises at least one contractible hoop tie, positionable axially along the axis of the mandrel, the or each hoop tie extending between two adjacent flexible elements in a plane normal to the axis of the mandrel, whereby contraction of the or each hoop tie causes the two adjacent flexible elements to move closer to one another.

The use of one or more hoop ties, which each connect two adjacent flexible elements together, can enable an asymmetric mandrel profile, such as, for example, an elliptical section, to be created.

Optionally, the means for adjusting the position of each of the flexible elements further comprises at least one contractible cross tie, positionable axially along the axis of the mandrel in a plane normal to the axis of the mandrel, the or each cross tie extending between two radially opposed flexible elements on opposing sides of the axis of the mandrel, whereby contraction of the or each cross tie causes the two radially opposed flexible elements to move closer to one another.

The use of one or more cross ties to bring two opposing flexible elements closer together may be used as an alternative technique for creating a rotationally asymmetric form on the mandrel.

Optionally, the plurality of flexible elements extends between the first and second flanges at an acute angle to the axis of the mandrel.

When laying a tape material onto the shaped mandrel, the orientation of the tape relative to the axis of the mandrel is dictated by the required mechanical properties of the finished composite article. Successive layers of the tape material are generally oriented at different angles to the mandrel axis. Examples of sequences of layup orientation angles include +60°/0°/−60° and +90°/−30°/+30°.

In some situations, where the tape is laid at an acute angle to the axis of the mandrel, it is possible for wrinkling of the tape material to occur. Such wrinkling may be minimised by rotationally offsetting the two flanges relative to one another such that the flexible elements subtend an angle to the axis of rotation approximately equal to the angle at which the tape is laid. In this way, the tape is laid normal to the axis of each flexible element.

In an alternative embodiment, in addition to rotationally offsetting the two flanges relative to one another, several support frames may be used to guide the flexible elements in a helical arrangement relative to the axis of rotation. This may assist in orienting the flexible elements so as to be normal to the tape, particularly where the mandrel has a large variation in cross sectional form.

Optionally, each of the plurality of flexible elements is tensioned simultaneously.

In one arrangement, the plurality of flexible elements may be brought together after passing through the flanges proximal to the defined revolute form. The gathered flexible elements may then be tensioned by means of a single actuator. This simplifies the configuration of the mandrel. In this arrangement, it may be advantageous to employ guide rollers at the points where the flexible elements pass through the flanges. This may minimise any friction between the flexible elements and the flanges and ensure a more repeatable tension between the flexible elements.

Optionally, each of the plurality of flexible elements is tensioned individually.

By tensioning each of the flexible elements individually, it may be possible to more easily configure the mandrel to have an asymmetrical revolute form.

Optionally, each of the plurality of flexible elements is formed from a material selected from the group comprising steel, stainless steel, aramid, high modulus polyethylene, carbon fibre, silicon, glass fibre, PTFE, PVC and polypropylene.

The choice of material for the flexible element is largely dictated by the need to be able to withstand the temperatures encountered when curing the finished composite lay-up. These temperatures are dictated by the material used for the tape or fibre layup.

A typical curing process involves a first "pre-cure" phase (≈135° C.) during which the shape of the article is fixed and the plies of the material are effectively debulked, and a "post-cure" phase (≈180° C.) in which the case material is fully cured. The mandrel is normally removed after the "pre-cure" phase and so would generally only be exposed to the lower temperature of ≈135° C.

A further requirement of the material is that it should be capable of maintaining the tensile load required to maintain the revolute form onto which the composite tapes, or other fibres, are to be laid.

Optionally, each of the plurality of flexible elements is coated with a material selected from the group comprising polyamide (Nylon®), PVC, polyethylene, polypropylene, polyvinylidene fluoride and PTFE.

The main purpose of the coating applied to the flexible elements is to enhance their release properties when removing the mandrel from the finished cured composite article.

In addition, the coating assists in enhancing the corrosion resistance of the flexible elements.

Optionally, the mandrel further comprises a heat shrinkable sheet material positioned over a radially outermost surface of the plurality of flexible elements to form a continuous surface, the surface defining an internal volume.

The formation of a continuous surface by the application of a heat shrinkable sheet material to the mandrel may improve the surface finish obtained on the inner surface of the finished component.

Optionally, the internal volume is pressurised with a gas.

By pressurising the internal volume with a gas it is possible to obtain a continuous curved surface over the revolute form defined by the flexible elements. This may further improve the surface finish obtained on the inner surface of the finished component.

Optionally, the gas is selected from the group comprising He, N and Ar.

It may be advantageous to use an inert gas to pressurise the internal volume since it will not react adversely with either the composite tape or fibre, or the heat shrinkable sheet material.

It may be advantageous to ensure the gas is dry so as to minimise the risk of moisture ingress into the composite material during the cure process. Such ingress of moisture may adversely affect the mechanical properties of the cured composite material by, for example, causing porosity in the cured composite article.

According to a second aspect of the present invention there is provided a method of using a mandrel to form a hollow component from a composite laminated material, the mandrel comprising first and second flanges spaced apart from one another along an axis of the mandrel, the method comprising the steps of:

a. positioning at least one flexible element support frame having a plurality of spokes, along the axis of the mandrel;

b. positioning a plurality of flexible elements between the first and second flanges, each flexible element being supported by a respective one of the spokes;

c. applying a composite fibre material to a radially outermost surface of the plurality of flexible elements;

d. curing the composite fibre material to form a composite revolute shell; and e. releasing the plurality of flexible elements and removing the mandrel from the formed revolute shell.

In the method of the present invention, once the mandrel has been prepared with its revolute form, the application of a composite fibre material may be advantageously applied by a conventional tape or fibre laying technique.

Optionally, step (b) comprises the additional steps of:

b'. positioning at least one contractible hoop element connected to each of the plurality of flexible elements along the axis of the mandrel, in a plane normal to the axis of the mandrel; and b". contracting the hoop element to move each of the plurality of flexible elements towards the axis of the mandrel by a pre-determined distance.

Optionally, step (c) comprises the additional initial step of:

c'. positioning a heat shrinkable sheet material over a radially outermost surface of the plurality of flexible elements, the surface defining an internal volume; and c". applying heat to the surface of the heat shrinkable sheet material to form a smooth, continuous revolute surface.

Optionally, the method comprises the additional step of:

d. pressurising the internal volume with a gas, the gas being selected from the group comprising He, N and Ar.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

There now follows a description of an embodiment of the invention, by way of non-limiting example, with reference being made to the accompanying drawings in which:

FIG. 3a shows a schematic elevational view of a flexible element support frame for use with the mandrel of FIG. 1;

FIG. 3b shows a schematic elevational view of an alternative locating portion for use with the support frame of FIG. 3a;

FIG. 4 shows a partial schematic view of a contractible hoop element for use with the mandrel of FIG. 1;

FIGS. 5a and 5b show alternative forms of locating the hoop tie of FIG. 4 on the flexible elements of the mandrel of FIG. 1;

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
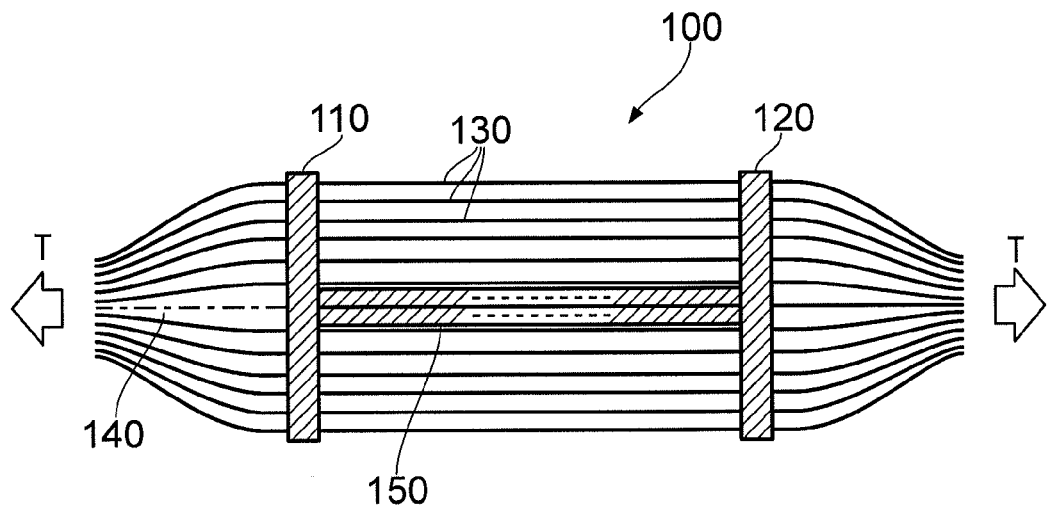
FIG. 1 shows a schematic elevational view of a mandrel according to the present invention.
Figure 2:
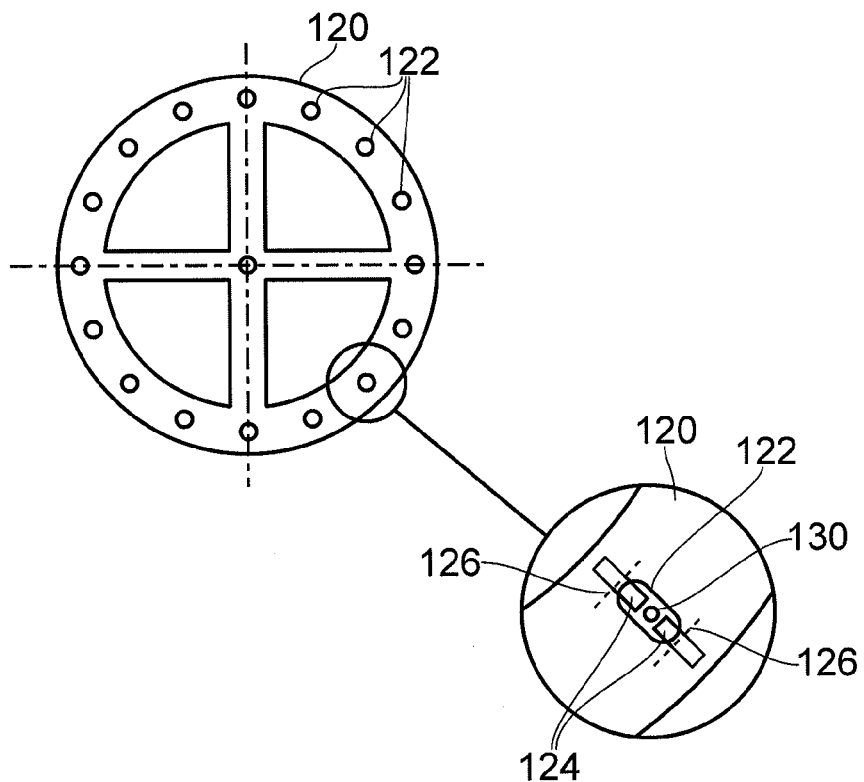
FIG. 2 shows a schematic end view of the mandrel of FIG. 1 with a detail view of the portion of the flange showing the flexible element passing between guide rollers.

Referring to FIGS. 1 to 5, a mandrel according to a first embodiment of the invention is designated generally by the reference numeral 100.

The mandrel 100 comprises first and second flanges 110, 120 which are parallel to one another and spaced apart along an axis of rotation 140 of the mandrel 100. The first and second flanges 110, 120 are separated from one another by a central post 150.

A plurality of flexible elements 130 in the form of braided wire cords extend between the first and second flanges 110, 120. Each of the plurality of flexible elements 130 is equi-spaced around the respective peripheries of the first and second flanges 110, 120.

Each of the first and second flanges 110, 120 comprises a plurality of holes 122 around their periphery; each hole 122 corresponding to a respective one of the flexible elements 130.

After passing through the first and second flanges 110, 120, the extremities of each of the flexible elements 130 are gathered together and connected to a tensioning means (not shown). The tensioning means applies a tensile load T to the flexible elements 130.

In order to minimise the adverse effect of friction between the flexible elements 130 and the flanges 110, 120, a pair of guide rollers 124 is located at each hole 122 with each flexible element 130 passing between a respective pair of the guide rollers 124. The axis of rotation 126 of the guide rollers 124 is arranged to be approximately tangential to the flanges 110, 120.

Adjustment of the radial position of each of the flexible elements 130 along the length of the mandrel 100 can be achieved by the use of one or more flexible element support frames 160 which are located along the central post 150.

Each support frame 160 comprises a support frame hub 162 which can be slidably positioned along the central post 150 and secured in position by a grub screw (not shown). Extending radially from the support frame hub 162 is a plurality of spokes 164 corresponding to the plurality of flexible elements 130. A stiffening ring 168 is attached to a mid-point of each of the spokes 164.

Each of the spokes 164 is provided, at its radially outermost end, with a locating portion 166. Each locating portion 166 is secured to a respective one of the flexible elements 130. As shown in FIG. 3a, the locating portion 166 takes the form of a U-shaped block which locates against the flexible element 130. In an alternative arrangement, shown in FIG. 3b, the locating portion takes the form of a grooved roller element which co-operates with the flexible element 130.

A further means of adjusting the radial position of each of the flexible elements 130 along the length of the mandrel 100 takes the form of a contractible hoop element 170. The hoop element 170 takes the form of a wire which is connected to each of the flexible elements 130 in a circumferential arrangement with the plane of the hoop element 170 being normal to the axis of rotation of the mandrel 140.

In one arrangement, shown in FIG. 5a, the hoop element 170 passes through a reinforced eyelet 172 positioned in each flexible element 130. In an alternative arrangement, shown in FIG. 5b, the hoop element 170 passes through a hook 174 suspended on a radially inner side of each flexible element 130.

Figure 6:
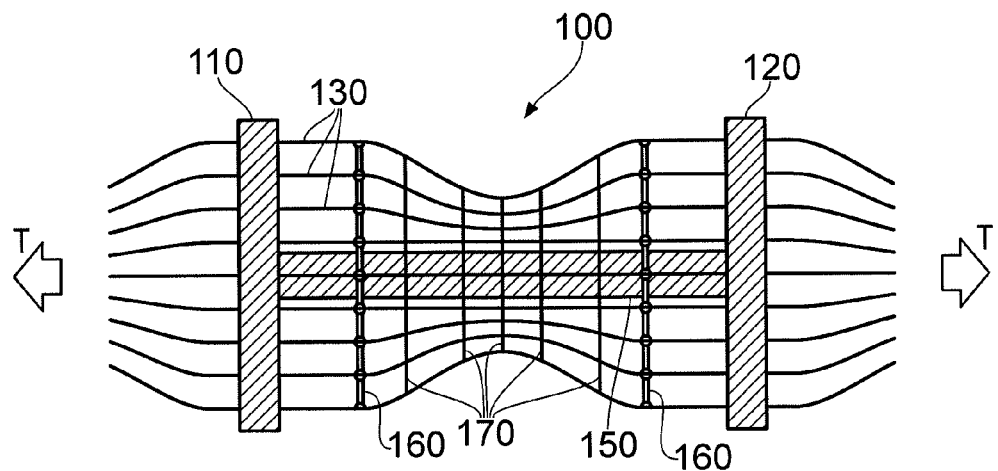
FIG. 6 shows a schematic elevational view of the mandrel of FIG. 1 together with two support frames and five hoop elements.

FIG. 6 shows an example of the use of support frames 160 and hoop elements 170 to radially position the flexible elements 130 as they extend between the first and second flanges 110, 120. In the example of FIG. 6, two support frames 160 and five hoop elements 170 are used to radially position the flexible elements 130 to thereby define a converging-diverging revolute form.

Figures 7A, 7B:
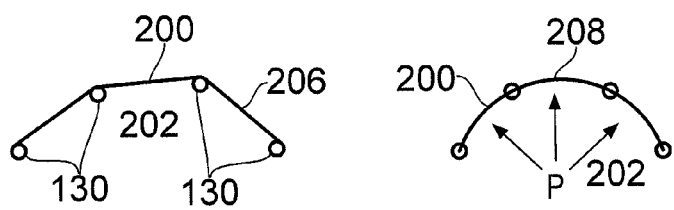
FIGS. 7a and 7b show partial sectional views of the mandrel of FIG. 1 covered with a heat shrinkable sheet material before and after the pressurisation of the internal volume.

As shown in FIGS. 7a and 7b, the radially outermost surface defined by the flexible elements 130 is covered with a heat shrinkable sheet material 200 which is subsequently shrunk to fit closely over the flexible elements 130 to form a smooth, continuous surface and to thereby define an internal volume 202.

While the mandrel 100 can be used in this form to produce a three dimensional hollow component by winding a composite tape of fibre over the radially outer surface defined by the flexible elements 130, this will result in a component having a polygonal or angular internal surface 206.

The internal volume 202 can then be pressurised with an inert gas, such as, for example, helium, nitrogen or argon. This pressurisation P of the internal volume 202 deforms the portions of the sheet material 200 between the flexible elements 130 in a radially outward direction to thus form a smooth, curved, continuous surface 208.

Figure 8:
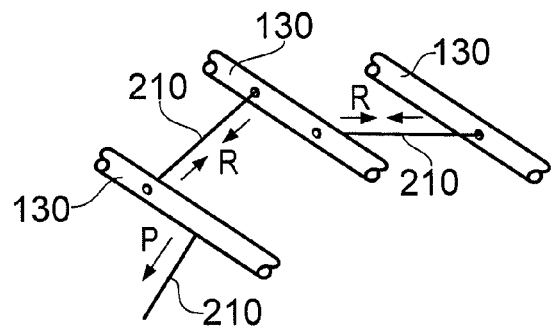
FIG. 8 shows a partial schematic view of a contractible hoop tie for use with the mandrel of FIG. 1.

In a second embodiment of the invention, an asymmetric, revolute form may be created by the use of one or more contractible hoop ties 210. Each hoop tie 210 connects two adjacent flexible elements 130 to one another, as shown in FIG. 8. By applying a tension R to the hoop tie 210, the two respective flexible elements 130 can be drawn closer to one another thus creating a local asymmetrical form to the mandrel 100.

Figure 9:
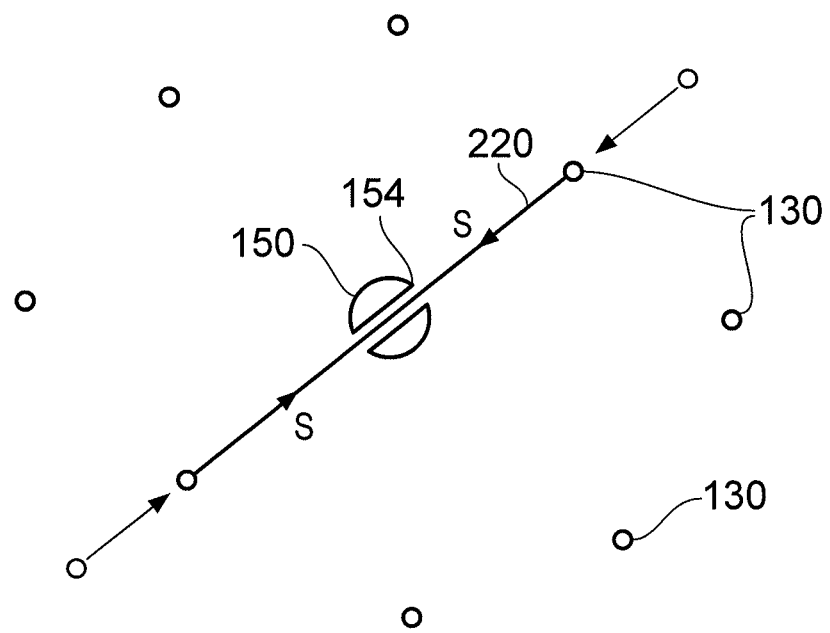
FIG. 9 shows a schematic sectional view of the mandrel of FIG. 1 showing a cross tie arrangement.

FIG. 9 shows an alternative means of obtaining an asymmetrical revolute form by the use of one or more contractible cross ties 220. Each cross tie 220 connects two flexible elements 130, on opposing sides of the central post 150, to one another. As shown in FIG. 9, where the two flanges 110, 120 are separated by a central post 150, the central post 150 comprises an aperture 154 therethrough to allow passage of the cross tie 220.

By applying a tension S to the cross tie 220, the two respective flexible elements 130 can be drawn closer to one another thus creating a local asymmetrical form to the mandrel 100.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within their scope.

What is claimed is:

1. A mandrel for forming a hollow component from a laminated material comprising:
   first and second flanges spaced apart from one another along an axis of the mandrel;
   a plurality of flexible elements extending between the first and second flanges; and
   an adjustment mechanism configured to adjust the position of each of the flexible elements along the length of the axis of the mandrel, such that the plurality of flexible elements define a three-dimensional revolute form, the adjustment mechanism including at least one flexible element support frame, positionable axially along the axis of the mandrel and having a plurality of locating portions, each of the plurality of locating portions being connected to a respective one of the plurality of flexible elements.

2. A mandrel as claimed in claim 1, wherein the first and second flanges are separated from one another by a central post aligned with the axis of the mandrel.

3. A mandrel as claimed in claim 1, wherein the adjustment mechanism further comprises at least one contractible hoop element, positionable axially along the axis of the mandrel and connected to each of the plurality of flexible elements in a plane normal to the axis of the mandrel, whereby contraction of the or each hoop element causes each of the plurality of flexible elements to move closer to the axis of the mandrel.

4. A mandrel as claimed in claim 1, wherein the adjustment mechanism further comprises at least one contractible hoop tie, positionable axially along the axis of the mandrel, the or each hoop tie extending between two adjacent flexible elements in a plane normal to the axis of the mandrel, whereby contraction of the or each hoop tie causes the two adjacent flexible elements to move closer to one another.

5. A mandrel as claimed in claim 1, wherein the adjustment mechanism further comprises at least one contractible cross tie, positionable axially along the axis of the mandrel in a plane normal to the axis of the mandrel, the or each cross tie extending between two radially opposed flexible elements on opposing sides of the axis of the mandrel, whereby contraction of the or each cross tie causes the two radially opposed flexible elements to move closer to one another.

6. A mandrel as claimed in claim 1, wherein the plurality of flexible elements extends between the first and second flanges at an acute angle to the axis of the mandrel.

7. A mandrel as claimed in claim 1, wherein each of the plurality of flexible elements is formed from a material selected from the group consisting of steel, stainless steel, aramid, high modulus polyethylene, carbon fibre, silicon, glass fibre, PTFE, PVC and polypropylene.

8. A mandrel as claimed in claim 1, wherein each of the plurality of flexible elements is coated with a material selected from the group consisting of polyamide, PVC, polyethylene, polypropylene, polyvinylidene fluoride and PTFE.

9. A mandrel as claimed in claim 1, further comprising a heat shrinkable sheet material positioned over a radially outermost surface of the plurality of flexible elements to form a continuous surface, the surface defining an internal volume.

10. A mandrel as claimed in claim 9, wherein the internal volume is pressurised with a gas.

11. A method of using a mandrel as claimed in claim 1 to form a hollow component from a composite laminated material, the method comprising:
  applying a composite fibre material to a radially outermost surface of the plurality of flexible elements;
  curing the composite fibre material to form a composite revolute shell; and
  releasing the plurality of flexible elements and removing the mandrel from the formed revolute shell.

12. A method as claimed in claim 11, wherein the applying a composite fibre material step comprises:
  positioning a heat shrinkable sheet material over a radially outermost surface of the plurality of flexible elements, the surface defining an internal volume; and
  applying heat to the surface of the heat shrinkable sheet material to form a smooth, continuous revolute surface.

13. A method as claimed in claim 12, the method comprising:
  pressurising the internal volume with a gas, the gas being selected from the group consisting of He, N and Ar.

* * * * *